UNITED STATES PATENT OFFICE.

LEÓ LOUIS AIMÉ ELIE PICOT DE LA PEYROUSE, OF PARIS, FRANCE.

IMPROVEMENT IN TREATING FATTY MATTERS.

Specification forming part of Letters Patent No. 121,162, dated November 21, 1871.

*To all whom it may concern:*

Be it known that I, LEÓ LOUIS AIMÉ ELIE PICOT DE LA PEYROUSE, doctor of medicine, of Rue La Fayette, Paris, in the Republic of France, have invented certain Improvements in the Treatment of Fatty Matters and new applications of fatty matters, of which the following is a specification:

The products resulting from the melting of beef and mutton fats are well known, and it is also well known that the disagreeable smell and appearance of tallow are the cause of its use being at present limited to candle and soap-making. It is well known that all the produce resulting from the melting of beef, mutton, pork, and other fats, as well as other fatty matters, oxidize very rapidly and become acid, whatever known mode of melting and treating them may have been used. Upon oxidizing, these substances become rancid and are, therefore, unsuitable for purposes of pharmacy, perfumery, and also for lubricating purposes, as they attack metals with which they come in contact. It is well known that these products, when they are oxidized, are totally unfit for alimentary purposes, as, besides being repulsive to the digestive organs, they are also dangerous to health.

My mode of treating beef, mutton, pork, and other fats, as well as other fatty matters, liquid or solid, animal or vegetable, has for its object: First, to melt fats without the use of acids and without the production of "greaves;" also, without smell and without the slightest danger to health. Second, to obtain melted fats pleasant to the eye and not resembling in any way the present products in the market, this mode of treating fats rendering them pure and permanently neutral—that is to say, preventing oxidation, and enabling such trades as perfumery, pharmacy, weavers, and others, to obtain results hitherto unattainable. Third, to enable the application of fine fats, especially beef fat, to alimentary and culinary purposes, and make such fat take a position between butter and lard, give it a good appearance, smell, and taste, and give it digestible qualities far superior to the freshest butter or lard. Fourth, to produce tallow for candles, making the candles white and hard, and give a better light, and devoid of that unpleasant odor peculiar to candles at present in the market. Fifth, to apply this new mode of treatment to all fatty matters, whether animal or vegetable, and separate them from the tissues or seeds or fruits in which they are enveloped. Sixth, to apply these processes to the treatment of greases, butters, or oils already oxidized, and to bring them back to a neutral condition. Seventh, to render low-priced cooking butters neutral and eminently digestible, and enable them to keep fresh and sweet for almost an indefinite period without alteration. Eighth, to treat in the same way fresh bones by ebullition, and also the solid parts of vertebrated animals, and to extract from them neutral and inodorous fat, oil, and marrow superior to all similar articles produced up to the present time. Ninth, to envelop with beef or other fats treated according to my invention, while in a warm and liquid state, fresh meat, or any other animal or vegetable substance from which the air and water have been sufficiently expelled by a partial cooking, which coagulates at the same time the exterior albumen. The meat or other substances which it is intended to preserve are then placed in a vessel or recipient of some sort, and the warm and inoxidizable fats, chiefly beef fat, are then poured upon the said meat or other substances at a temperature of about 50° centigrade. The fats which thus envelop the meat on all sides soon become solidified and preserve it from any putrid decomposition, keeping it for a very long period, without imparting any taste, in a proper alimentary condition. Tenth, also and particularly to mix the said liquid beef fat in the proportion of twenty-five to thirty-five per cent., by kneading with warm flour of leguminous plants, such as peas, beans, lentils, or any other flour, fecula, or farinaceous substance, adding to them the necessary spices, salt, and seasoning; then to press them in a vessel or recipient of some sort, and to obtain from them, after cooling, a dry compound, which I call "concrete purée," which keeps fresh without any alteration or fermentation for an almost indefinite period, thus providing an essentially nutritive food of good taste, suitable for the alimentation of armies, navies, and colleges, as well as for the numerous class of people to whom economy of time and money is a necessity. Also, to mix the same fats at a temperature of about 40° to 45° centigrade with dry meat in a powdered state or otherwise, or with fresh vegetables reduced into a pulp, and from which the water has been extracted by a sufficient pressure or by evaporation, with or without an addition of flour or fecula of peas, beans, lentils, or other farinaceous substance, to which are added the necessary spices and seasoning, and thereby prepare succulent soups in a concrete and dry state, capable of keeping fresh, and yielding when diluted with water from nine to ten pounds of perfect pureé soup of suitable thickness for each pound of concrete soup or pureé employed.

Previous to my description of the substances which I employ, and which form part of my new methods in the treatment of fatty matters, I must first observe that they are all inorganic salts and are to be used in a dissolved state. That these salts, dissolved in a volume of water at least equal to fifty per cent. of the weight of the fatty matters to be treated, act upon the said fatty matters, while the ebullition is carried on for a period of from one to six hours in the vats or vessels where the melting takes place. That the vats or vessels in which the melting and treatment takes place are to be made of wood for the melting of beef fat, and for the treatment of mutton and pork fats and other animal or vegetable fatty matters they are to be made of wood lined inside with thin pure tin sheeting, or of tinned copper. That the water used for the ebullition of the fatty matters must be distilled water or water devoid of any calcareous salts. That the ebullition of the water must be brought on by the heat of steam circulating through a closed coil placed about four inches above the bottom of the vat or vessel, or by means of jacketed vats or outside circulation. It can also be done by using tinned copper vats placed above a suitably-arranged furnace.

The substances which I employ are mixtures of carbonates, of oxide of sodium, or of potassium, or ammonium, with some earthy or alkaline chlorides, such as chlorides of sodium, potassium, calcium, magnesium, and aluminium, in solution, and put in contact by ebullition with the fatty matters which it is proposed to melt or treat. Among the various alkaline carbonates (monocarbonate, sesquicarbonate, or bicarbonate) those whose action is the most certain are the sesquicarbonates or bicarbonates of oxide of potassium, used in the proportions of about two pounds and a quarter to a thousand pounds' weight of the fatty matters to be treated, mixed with about five pounds of chlorides of potassium, or sodium, or other alkaline chloride, to a thousand pounds' weight of the fatty matters to be melted. For fatty matters already melted and which it is proposed to restore, the proportion of alkaline carbonates is to be about one pound of the alkaline carbonates to a thousand pounds' weight of fatty matters, and when using earthy or alkaline chlorides the proportion must be about two pounds to a thousand pounds' weight of the fatty matters to be treated. The carbonate of oxide of potassium alone, but much better when combined with chlorides of sodium, potassium, or aluminium, are those which are the most suitable for the melting of alimentary fats, such as beef and pork fats, and for the melting of mutton fats to be used for perfumery and pharmaceutical purposes, and for the lubricating of steam and other machinery, and for the manufacture of candles. The carbonates of oxide of sodium alone, but better when combined with chloride of sodium or aluminium and with sugar, produce inoxidizable and hard products, savory, and particularly suitable for summer melting. For the melting of one thousand pounds of raw fat I use a proportion of about two and a half pounds of carbonate of oxide of sodium, about five pounds of chloride of sodium, and about eight to ten pounds of sugar, and all fatty matters thus treated are perfectly sweet and neutral.

I have obtained notable advantages by mixing, in about one-half the proportions above given, the carbonates of oxide of sodium and potassium with chlorides of sodium, potassium, or aluminium.

In conclusion, I will describe the operation of melting and treating one ton of raw fat, either beef or mutton or pork, according to my invention. Being first provided with a vat or vessel containing about one hundred and forty-two gallons of distilled water, I pour in the said water a solution of about four and three-quarters to five pounds of sesquicarbonates or bicarbonates of oxide of potassium or aluminium. The dose is to be about three and three-quarters to four pounds if the monocarbonate of oxide of potassium is used. A solution of about ten pounds of chloride of sodium or potassium, or about four pounds of chloride of aluminium, is then to be added. When this is done the ebullition is commenced, and when it has attained its full development the ton of fat, after having previously been cut into small pieces, is thrown into the vat gradually, and the operation begins. As the coagulated albumen rises to the surface in scum it is carefully skimmed off. The ebullition must be very active during the first hour; afterward it is to be moderated, and it is left to go on from about five to six hours, when all the fat becomes separated from the membranes and cells which retained it. At this point, and after having added some fresh distilled water two or three times during the operation, the melting is ended, the steam is withdrawn, and the whole is left to rest for two or three hours before passing the melted fat into the refrigerators, from which it is afterward poured into the casks or intended packages.

If it is intended to restore the fats already melted the proportion of the above salts to be used is about half the quantity of what is used for melting raw fats, and the ebullition is to last only from about thirty to sixty minutes.

Having thus described the nature of my said invention, and the mode in which I carry the same into effect, I would have it understood that what I claim is—

1. The employment of mixtures of alkaline carbonates, (monocarbonates, sesquicarbonates, bicarbonates,) of oxides of sodium, potassium, or ammonium, with some alkaline or earthy chlorides, such as chlorides of sodium, potassium, magnesium, aluminium, dissolved and put in contact by ebullition with the fatty matters which it is proposed to melt or purify, in manner substantially as herein described, and thereby to effect the melting and treating of fatty matters without the use of acids or the production of greaves, while at the same time the fatty matters separated from their membranes and so treated are neutral and inoxidizable.

2. As a new article of manufacture, fats treated as above described, adapting them for use for culinary purposes in lieu of butter, lard, and raw suet, and to envelop fresh meat and other animal and vegetable substances for the purpose of preserving them, in manner substantially as herein described.

3. The manufacture, with the alimentary fats treated according to my invention, of solid or concrete soups by the mixture of such fats with flour of peas, beans, lentils, and other farinaceous substances, and fecula, and with dry meat or with fresh vegetables, in manner substantially as herein described.

L. DE LA PEYROUSE.

Witnesses:
 FREDK. HARRIS,
 B. J. B. MILLS,
  *Of 35 Southampton Buildings, London.*
(26)